US012496840B2

(12) United States Patent
Sato et al.

(10) Patent No.: US 12,496,840 B2
(45) Date of Patent: Dec. 16, 2025

(54) RECORDING APPARATUS, AND METHOD FOR CONTROLLING RECORDING APPARATUS

(71) Applicant: CANON KABUSHIKI KAISHA, Tokyo (JP)

(72) Inventors: Ryosuke Sato, Kanagawa (JP); Kengo Nieda, Kanagawa (JP); Shunya Sunouchi, Tokyo (JP); Masahiro Sugimoto, Kanagawa (JP); Yusuke Nakaya, Tokyo (JP); Yuichiro Yanagi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 18/396,978

(22) Filed: Dec. 27, 2023

(65) Prior Publication Data

US 2024/0217249 A1 Jul. 4, 2024

(30) Foreign Application Priority Data

Dec. 28, 2022 (JP) ................................ 2022-212016

(51) Int. Cl.
*B41J 15/16* (2006.01)
*B41J 15/04* (2006.01)

(52) U.S. Cl.
CPC ............. *B41J 15/16* (2013.01); *B41J 15/046* (2013.01); *B41J 15/048* (2013.01); *B41J 15/165* (2013.01); *B41J 15/04* (2013.01)

(58) Field of Classification Search
CPC ........ B41J 15/16; B41J 15/046; B41J 15/048; B41J 15/165; B41J 15/04
See application file for complete search history.

(56) References Cited

U.S. PATENT DOCUMENTS

| | | | | |
|---|---|---|---|---|
| 2012/0019580 | A1* | 1/2012 | Tokushima | B41J 11/006 347/14 |
| 2017/0282602 | A1* | 10/2017 | Aoki | B41J 15/16 |
| 2024/0109346 | A1* | 4/2024 | Fujiwara | B41J 15/16 |
| 2024/0169175 | A1* | 5/2024 | Kurasawa | G06K 15/408 |

FOREIGN PATENT DOCUMENTS

| | | | |
|---|---|---|---|
| JP | 08-231101 | A | 9/1996 |
| JP | 2006-182031 | A | 7/2006 |

* cited by examiner

*Primary Examiner* — Henok D Legesse
(74) *Attorney, Agent, or Firm* — Venable LLP

(57) ABSTRACT

With a recording apparatus for performing recording onto a continuous sheet to be conveyed, for starting conveyance of the continuous sheet, control is started so that with a first conveyance roller for conveying the continuous sheet on the upstream side of a recording portion in a conveyance path of a continuous sheet being stopped, the speed of a second conveyance roller for conveying the continuous sheet on the downstream side of the recording portion in the conveyance path becomes a first speed, and control is changed so that the speed of the second conveyance roller becomes a second speed faster than the first speed, and moreover control of the first conveyance roller is started so that the speed of the first conveyance roller may become a third speed faster than the first speed and slower than the second speed.

16 Claims, 6 Drawing Sheets

RECORDING APPARATUS, AND METHOD FOR CONTROLLING RECORDING APPARATUS

BACKGROUND OF THE INVENTION

Field of the Invention

The present invention relates to control of conveyance of a sheet in a recording apparatus.

Description of the Related Art

Conventionally, some recording apparatuses record an image onto a continuous sheet (web) of a sheet, which is wound in a roll, and drawn from a roll portion thereof as a recording material, and are configured such that the sheet is applied with a tension at the time of recording. With regard to such apparatuses, known is the configuration in which the slack of the sheet or a variation in tension caused when the conveyance speed is switched (when the speed is increased from the conveyance stop state to a given speed, or in other cases) is suppressed.

In Japanese Patent Application Publication No. 2006-182031, a paper feeding portion, an infeed portion, a print portion, and a nipping roller are arranged sequentially from the upstream side toward the downstream side in the sheet conveyance direction at the time of recording. Before start of recording, the infeed roller is rotated in the opposite direction to the sheet conveyance direction, and the nipping roller is driven in the same direction as the sheet flow direction at the time of recording. The configuration is disclosed in which, through implementation of abovementioned operations, the slack of the sheet is addressed by applying a predetermined tension to the sheet before the start of recording.

Japanese Patent Application Publication No. H08-231101 discloses an apparatus for performing tension conveyance while braking using a clutch, configured such that a torque lower limit value restriction is imposed on a closed loop control system for controlling the torque applied by a clutch, thereby preventing divergence of the tension.

SUMMARY OF THE INVENTION

Incidentally, with the tension control system for sheet conveyance as described above, undesirably, a variation in tension fluctuation increases at the time of changing the speed of the sheet. As in Japanese Patent Application Publication No. 2006-182031, when, before acceleration of a motor to a given speed for performing recording from the stopped state, the infeed roller is reversely rotated and the sheet slack is removed, and moreover control for causing normal rotation is performed, a variation in sheet tension increases for transition from reverse rotation to normal rotation. When the speed of the infeed roller is increased to the recording speed with a largely varying and diverging tension, it takes a longer time for the speed to settle down to a predetermined tension value required for recording, resulting in an increase in undesirable sheets (misprinting).

Further, also with the configuration in which the torque lower limit restriction is imposed on the clutch as in Japanese Patent Application Publication No. H08-231101, even hunting of the tension can be suppressed upon increasing the speed to a predetermined speed capable of performing recording from the conveyance stopped state, it takes a longer time to reach a prescribed tension value.

It is an object of the present invention to provide the technology of stabilizing conveyance of a continuous sheet.

In order to attain the object, a recording apparatus of the present invention includes:

- a recording portion for performing recording onto a continuous sheet to be conveyed;
- a first conveyance roller for conveying a continuous sheet on an upstream side of the recording portion in a conveyance path of the continuous sheet;
- a second conveyance roller for conveying a continuous sheet on a downstream side of the recording portion in the conveyance path; and
- a control unit for controlling the first conveyance roller and the second conveyance roller,
- wherein the control unit,
  - starts control such that a speed of the second conveyance roller becomes a first speed, with the first conveyance roller being stopped, and
  - changes control such that the speed of the second conveyance roller becomes a second speed faster than the first speed, and starts control of the first conveyance roller such that a speed of the first conveyance roller becomes a third speed faster than the first speed and slower than the second speed.

In order to attain the object, a method for controlling a recording apparatus of the present invention is provided,

- the recording apparatus including
- a recording portion for performing recording onto a continuous sheet to be conveyed,
- a first conveyance roller for conveying a continuous sheet on an upstream side of the recording portion in a conveyance path of a continuous sheet,
- a second conveyance roller for conveying a continuous sheet on a downstream side of the recording portion in the conveyance path, and
- a control unit for controlling the first conveyance roller and the second conveyance roller,
- the method for controlling the recording apparatus comprising:
  - starting control such that a speed of the second conveyance roller becomes a first speed, with the first conveyance roller being stopped; and
  - changing control such that the speed of the second conveyance roller becomes a second speed faster than the first speed, and starting control of the first conveyance roller such that a speed of the first conveyance roller becomes a third speed faster than the first speed and slower than the second speed.

In accordance with the present invention, it becomes possible to stabilize the conveyance of a continuous sheet.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments.

Below, embodiments of the present invention will be described specifically by reference to the accompanying drawings. A recording apparatus 1 of the present example is a high-speed line printer for drawing a sheet wound in a roll as a recording material from a roll portion, and performing recording thereon. For example, the recording apparatus 1 is suitable for the print field of high-volume print in, for example, a print laboratory.

Example 1

Figure 1:
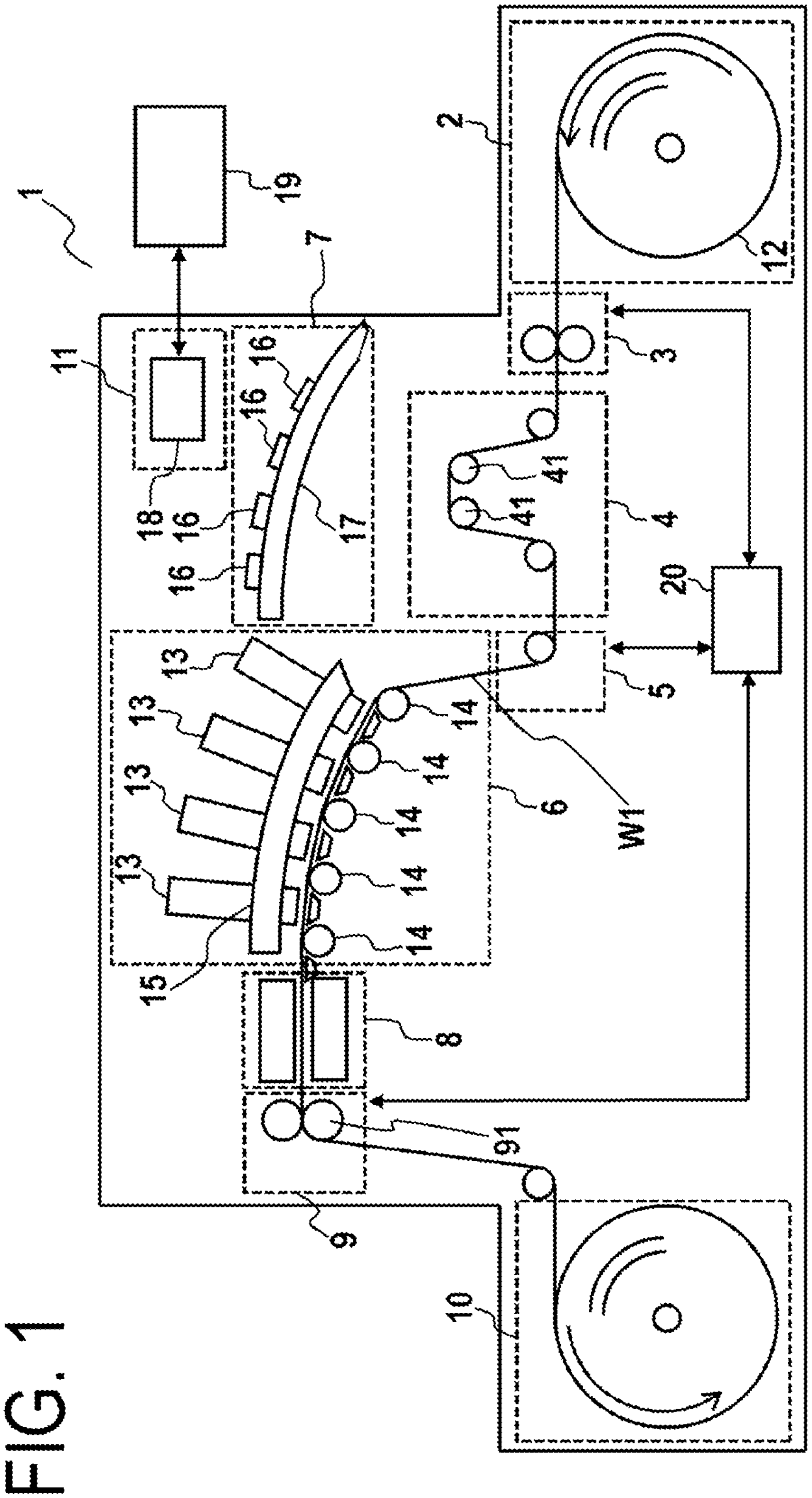
FIG. 1 is a schematic view showing an internal configuration of a recording apparatus in accordance with Example 1 of the present invention.

FIG. 1 is a schematic cross sectional view showing the internal configuration of the recording apparatus 1. The recording apparatus of the present Example includes in the inside thereof, largely, respective units of a sheet supply portion 2, a first conveyance roller pair 3, a meandering correction portion 4, a tension detection portion 5, a recording portion 6, a head cleaning portion 7, a drying portion 8, a second conveyance roller pair 9, a sheet collecting portion 10, and a control portion 11. The sheet is conveyed along the sheet conveyance path indicated with a solid line in the drawing, and is processed at respective units.

The sheet supply portion 2 is a unit for holding and supplying a sheet wound in a roll. The sheet supply portion 2 is configured to accommodate a roll 12, and draw and supply a sheet. Incidentally, the number of accommodatable rolls is not limited to 1, and it may be configured such that two, or three or more rolls are accommodated, and a sheet is alternatively drawn and supplied. Further, the sheet is not limited to a sheet wound in a roll so long as it is a sheet to be stretched between various rollers, and to be applied with a prescribed tension for undergoing recording. For example, the sheet is also acceptable which is provided with perforations per unit length, and is folded at each perforation to be stacked, and accommodated in the sheet supply portion 2.

The first conveyance roller pair 3 is a unit on the downstream side of the sheet supply portion 2, and for feeding a sheet to the meandering correction portion 4, the tension detection portion 5, the recording portion 6, and the drying portion 8 arranged in this order on the downstream side, and applying a sheet tension between it and the second conveyance roller pair 9. The first conveyance roller pair 3 is rotated and performs tension conveying by driving a motor (not shown). Incidentally, motors as each power source for various rollers may be provided separately for each type of roller, or the configuration is also acceptable in which a power is branched from a common motor, and is made transmittable to each roller, and driving control is performed individually by clutch control, or the like.

The meandering correction portion 4 is a unit (meandering correcting unit) for correcting meandering of the sheet at the time of tension conveying of the sheet. The meandering correction portion 4 is configured to include a meandering correcting roller 41, and a meandering detecting sensor for detecting meandering of the sheet (not shown). The meandering correcting roller 41 can change the inclination (parallelism) of the first conveyance roller pair 3 and the sheet by a motor (not shown), and performs meandering correction of the sheet on the basis of the measurement of the meandering detecting sensor. At this step, winding of the sheet around the meandering correcting roller 41 can enhance the function of meandering correction.

The tension detection portion 5 is a unit for detecting the tension of the sheet when tension conveying is performed between the first conveyance roller pair 3 and the second conveyance roller pair 9.

The recording portion 6 is a sheet processing portion for performing recording processing, on a sheet being conveyed, of discharging and adding dropwise an ink as a recording liquid from above on the sheet by each recording head 13, and forming an image. The conveyance path in the recording portion 6 is formed of guide rollers 14 arranged in an array in a parabolic shape with upward convex. By applying the sheet with a given tension, the clearance with the recording head 13 is ensured. The recording heads 13 are configured such that a plurality of recording heads is arrayed in an array in a parabolic shape along the conveyance direction following the conveyance path. In the present Example, the recording heads 13 include four line type recording heads corresponding to four colors of Bk (black), Y (yellow), M (magenta), and C (cyan). Incidentally, the number of colors and the number of the recording heads 13 are not limited to 4.

The plurality of recording heads 13 is integrally held by a head holder 15, and the head holder 15 is movable in the vertical direction so as to change the clearance between the sheet and each recording head 13. As the ink jet system, there can be adopted a system using a heat generating element, a system using a piezo element, a system using an electrostatic element, a system using a MEMS element, or the like. Inks of respective colors are supplied from their respective ink tanks to their corresponding respective recording heads 13 via respective tubes, respectively.

The head cleaning portion 7 includes a cleaning unit (not shown) for cleaning the ink discharge surface of the recording head 13, and a cap unit 16 for retaining the moisture of the ink discharge surface of the recording head 13. For the cleaning unit, wiping out by an elastic body blade of urethane or the like, a band-shaped fabric or nonwoven fabric, suction by a rubber-shaped suction nozzle, or the like is selected from over a wide range according to the characteristics of the ink used, the recording time, and interval, and the cleaning unit has no restriction. The cap unit 16 brings a rubber member formed in a tube shape into contact with the outside of the discharge nozzle region of the ink discharge surface, thereby reducing the contact between the outside air and the discharge nozzle, and suppressing drying. The form thereof has no restriction, and a closed space may be formed by arranging rubber ribs, or the like on a sheet-shaped member, and bringing the ribs into contact therewith. Alternatively, in order to make the pressure applied to the discharge nozzle equal to atmospheric pressure, an atmosphere communication path may be provided in such a range as not to affect suppression of drying.

Further, the configuration is also acceptable in which the closed space is applied with a negative pressure, so that the ink is sucked out through the nozzle. In order to enhance the moisture retaining ability, the configuration is also acceptable in which a liquid is supplied into the cap, thereby increasing the humidity.

A plurality of cleaning units and cap units 16 are arranged in a parabolic shape corresponding to the plurality of recording heads 13, and are held integrally in a cleaning holder 17, which is configured to be movable slidably in the sheet conveyance direction. FIG. 1 shows a state at the time of recording, in which the head cleaning portion 7 is situated on the upstream side in the sheet conveyance direction with respect to the recording portion 6. On the other hand, at the time of the cleaning operation, the head cleaning portion 7 is situated immediately under the recording head 13 of the recording portion 6. Incidentally, the configuration of the head cleaning portion 7 is not limited to the configuration including the cleaning units and the cap units 16, and the head cleaning portion 7 may be configured of only any one of the cleaning units and the cap units 16. Further, the slide movement direction of the head cleaning portion 7 is not limited to the sheet conveyance direction, and may be the direction perpendicular to the sheet conveyance direction.

The drying portion 8 is a unit for heating the sheet subjected to recording at the recording portion 6, and drying the applied ink for a short time. In the inside of the drying portion 8, a hot air current is applied to the passing sheet on at least the upper surface side, namely, the ink applied surface side, thereby drying the ink applied surface. Incidentally, the drying system is not limited to the system of applying a hot air current, and may be a system of irradiating the sheet surface with an electromagnetic wave (such as an ultraviolet ray or an infrared ray).

The second conveyance roller pair 9 is a unit of conveying a sheet while applying a tension with the first conveyance roller pair 3. The second conveyance roller pair 9 is rotated by being driven by a second conveyance motor 92 (described later), so that the tension of the sheet is adjusted by a clutch capable of controlling the torque driven and coupled (described later) according to the tension value detected by the tension detection portion 5 by the tension control portion 20. Incidentally, as an additional configuration for adjusting the tension of the sheet, there may be added a configuration in which the speed of the second conveyance roller pair 9 is controlled by the tension detection portion 5. In this case, the tension control methods include two systems of a torque control method for controlling the torque value transmitted from the clutch, and a speed control method for controlling the roller speed of the second conveyance roller pair 9. The tension control methods can be switched according to the intended purpose, or both can be used at the same time.

The sheet collecting portion 10 is a unit for winding the sheet subjected to recording processing. The number of the collectable rolls is not limited to 1. It may be configured such that the sheet collecting portion 10 has two or three or more winding cores, which are alternatively switched, thereby collecting the sheet. Incidentally, depending upon the processing treatment contents after recording, not the configuration of winding the sheet around the winding core, but the configuration in which a continuous sheet is cut using a cutter, and the cut sheets are stacked may be adopted.

The control portion 11 is a unit in charge of control of each part of the whole recording apparatus. The control portion 11 has a CPU, a storage device, a controller including various control portions, an external interface, and an operation portion 18 for a user to perform input/output. The operation of the recording apparatus 1 is controlled on the basis of an instruction from a host device 19 such as a controller, or a host computer connected with the controller via an external interface.

Figure 2:
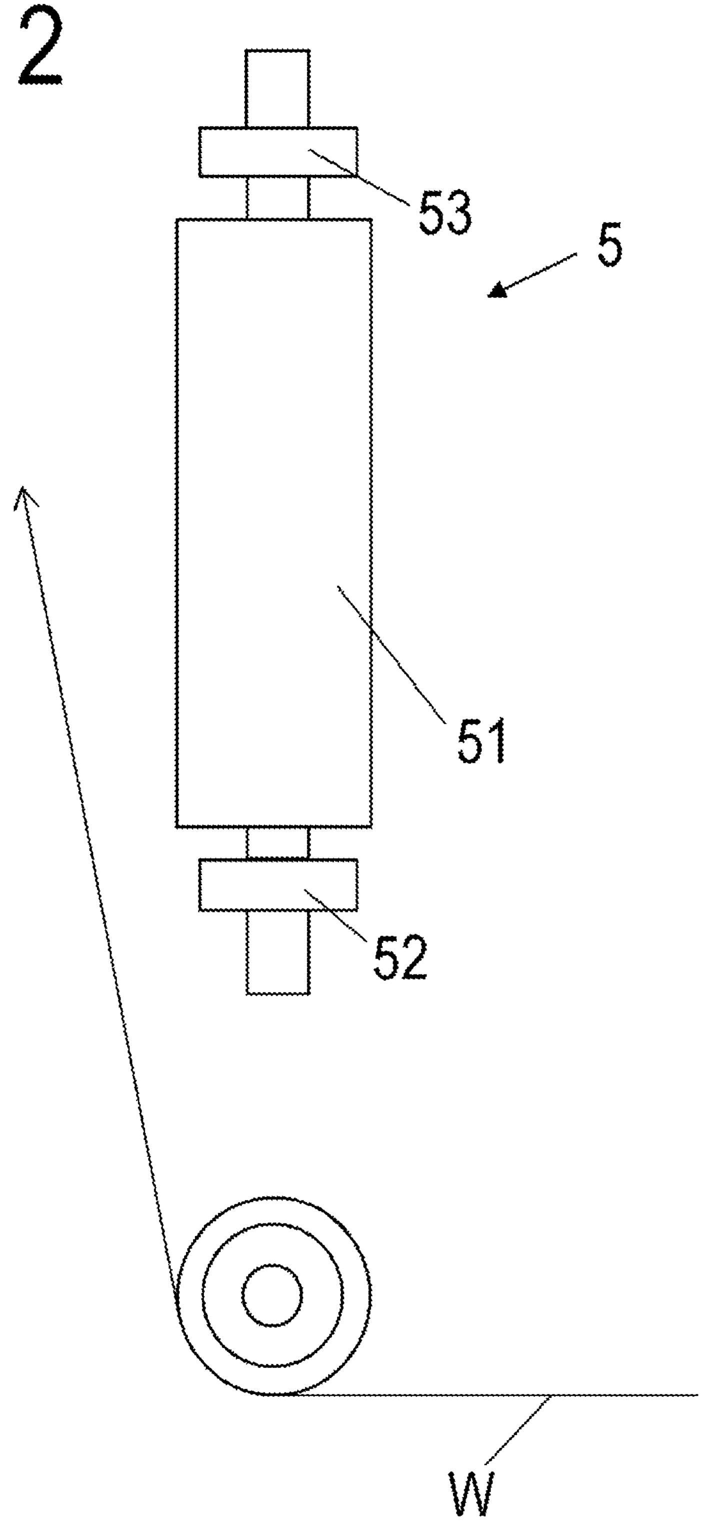
FIG. 2 is an explanatory view of a tension detection portion of Example 1.

Referring to FIG. 2, the configuration of the tension detection portion 5 as a tension detecting unit will be described. FIG. 2 is an explanatory view of the tension detection portion 5 in Example 1. The tension detection portion 5 is pivotally supported by a first bearing 52 and a second bearing 53 respectively provided with load cells as the tension detecting portions at both ends thereof. The tension detection portion 5 detects the tension applied by sheet conveyance of the first conveyance roller pair 3 and the second conveyance roller pair 9. The load cells (tension detection members) are respectively arranged at the pair of bearings 52 and 53 at both ends of the tension detecting roller 51. This enables detection of the difference in sheet tension between both ends in the sheet width direction crossing with (orthogonal to) the sheet conveyance direction. Namely, the first bearing 52 and the load cell provided thereon function as a first tension detector for detecting the tension acting on one end side of the tension detecting roller 51. Similarly, the second bearing 53 and the load cell provided thereon function as a second tension detector for detecting the tension acting on the other end side of the tension detecting roller 51.

Incidentally, the difference in sheet tension between both ends is often caused by meandering of the sheet. When the difference in tension between the first tension detector (first bearing 52) and the second tension detector (second bearing 53) is detected, and the difference exceeds a prescribed value, a proper tension value capable of meandering correction is applied with feedback. As a result, it is also possible to correct meandering by the meandering correction portion 4 rapidly. For example, with the meandering correction portion 4 of the present Example, by increasing the tension value, meandering tends to be resolved for general sheet conveyance media. On the other hand, when the tension value is increased, the sheet conveyance media tend to be wrinkled. The optimum tension value resulting in faster meandering resolving and no wrinkling is preferably set according to the sheet conveyance media to be recorded.

Figure 3:
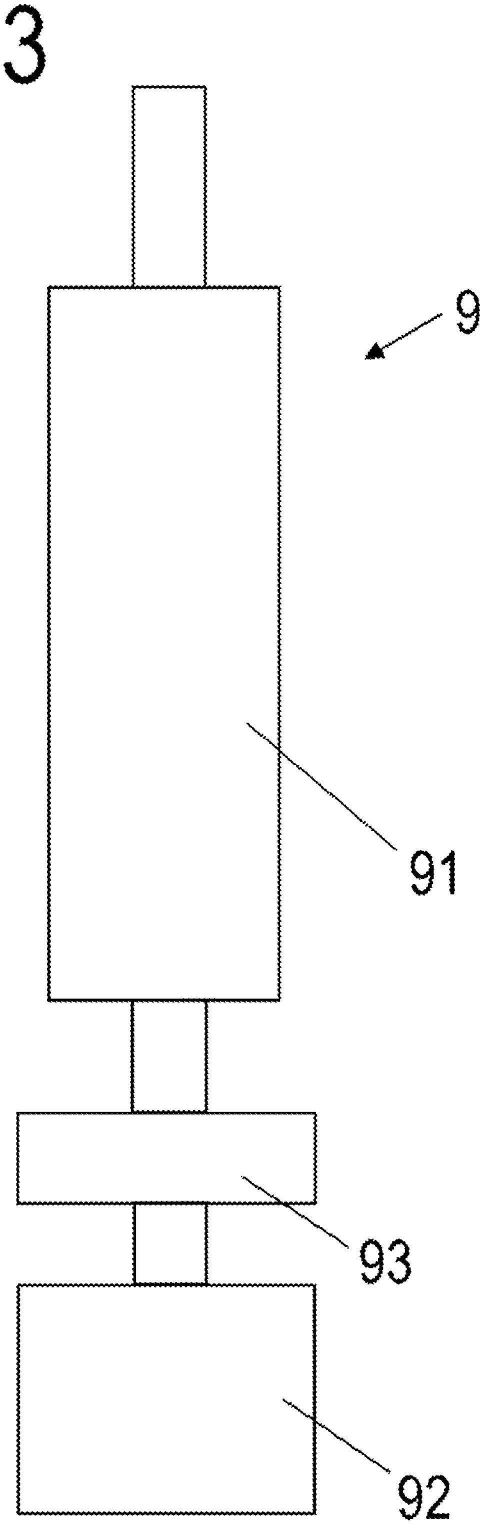
FIG. 3 is an explanatory view of a tension adjusting unit of Example 1.

Referring to FIG. 3, a description will be given to the tension adjusting unit driving coupled with the second conveyance roller pair 9. FIG. 3 is an explanatory view of the tension adjusting unit driving coupled to a second conveyance roller 91 in Example 1. The tension adjusting unit is configured such that driving coupling between the second conveyance roller 91 and the second conveyance motor 92 as a power source is established by an electromagnetic clutch 93 as a torque adjusting unit. The electromagnetic clutch 93 can adjust the driving transmission force (torque) changeably by the voltage action value to be applied. The electromagnetic clutch 93 performs PMW control. Herein, when duty is 0%, driving transmission is cut, and when 100%, the maximum driving force is transmitted.

Incidentally, in the present Example, for the forgoing tension adjusting unit, the example driving coupled to the second conveyance roller pair 9 was shown. However, the tension adjusting unit may be driving coupled to the first conveyance roller pair 3, or may be driving coupled to both, respectively.

Figure 4:
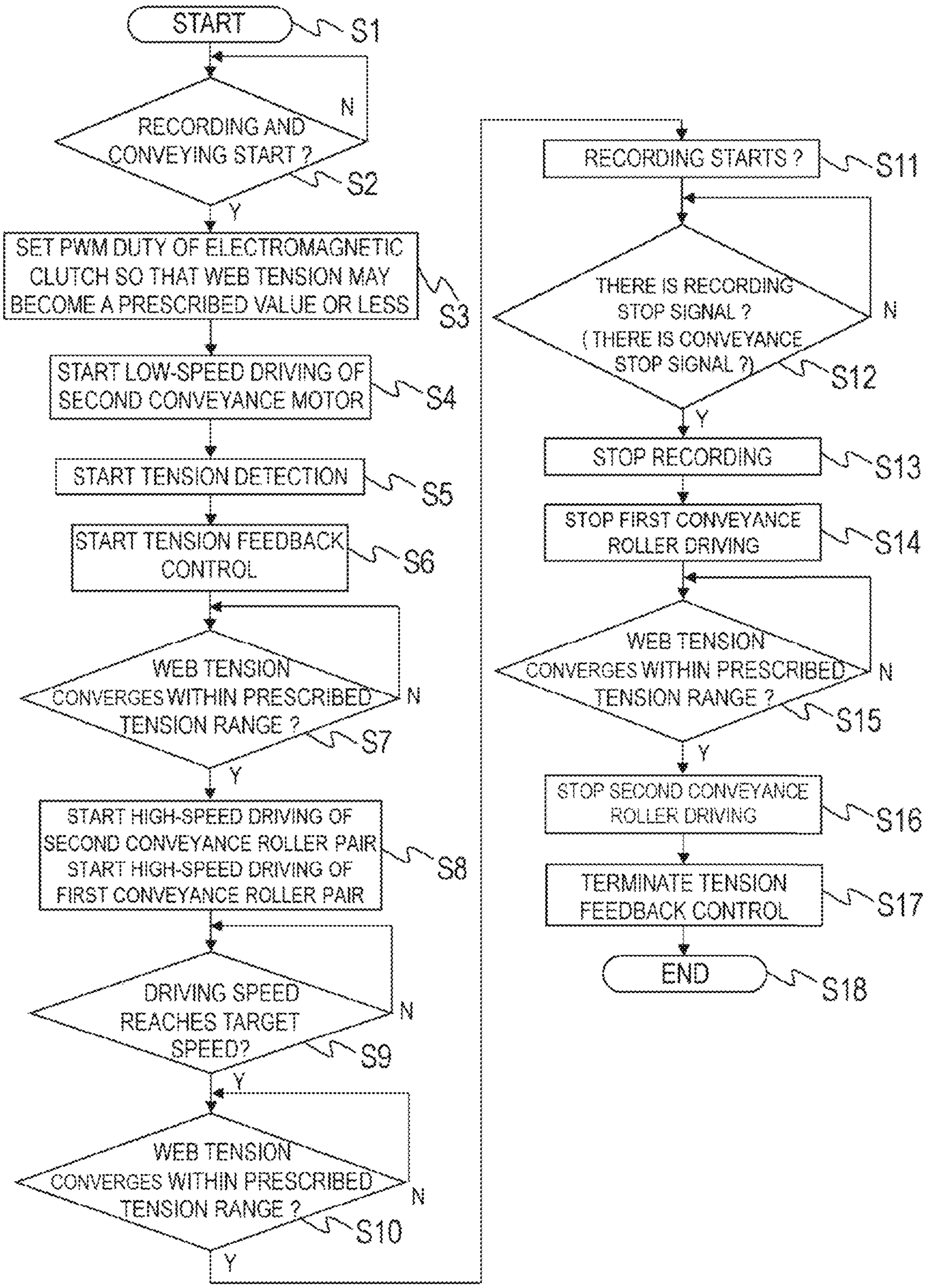
FIG. 4 is a flowchart for illustrating conveyance control of Example 1.

Referring to the flowchart of FIG. 4, a description will be given to the order of controls for allowing a prescribed tension capable of recording on a sheet to act for increasing the speed up to a given speed capable of recording from a conveyance stopped state. FIG. 4 is a flowchart for illustrating the order of performing of recording from the conveyance stopped state, and then stopping conveyance in Example 1. Incidentally, the following control is performed by controlling the configuration of each part of the apparatus including the tension control portion 20 mainly by the control portion 11 as a control unit.

In a step S1, when recording data is transmitted from the host device 19 to the control portion 11, as an apparatus, a preparation operation of tension conveying and recording of a sheet is started. In a step S2, when it is determined that the recording conveyance operation preparation in the apparatus has been completed, in a step S3, the PWM duty of the electromagnetic clutch 93 is set at 0%, namely, the electromagnetic clutch 93 is turned OFF. The setting cuts driving transmission of the second conveyance motor 92 to the second conveyance roller 91. In a step S4, the second conveyance motor 92 is driven. At this step, a lower speed (e.g., 10 m/s) than a sheet conveyance speed required for recording (e.g., 100 m/s) is preferable. The operation causes the second conveyance motor 92 to idle with respect to the stopping sheet W and second conveyance roller 91 via the electromagnetic clutch 93.

Incidentally, the present Example shows an example in which the PWM duty of the electromagnetic clutch 93 is set at 0%, and the initial tension is hardly caused to act on the sheet. Namely, when the PWM duty is 0%, the second conveyance roller pair is not rotated. Incidentally, setting of the initial tension value may be changed according to the kind of the sheet. For example, a fixed value table is provided for each kind of the sheet (recording paper). When the set paper kind information is received from the operation portion 18, the initial tension value may be set with reference to the fixed value. The second conveyance roller pair is rotated according to the PWM duty. At this step, the PWM duty value of the electromagnetic clutch 93 is preferably set so as to achieve a prescribed tension required for recording (e.g., 40 N) or less at which the sheet does not undergo plastic deformation, and control tends to be resolved.

In a step S5, the tension detection portion 5 starts tension detection. In the case of the present Example, the PWM duty of the electromagnetic clutch 93 is set at 0%. For this reason, driving of the second conveyance motor 92 is not transmitted to the second conveyance roller 91. Therefore, the tension of the sheet W is scarcely detected. As described above, when a prescribed value is set as the PWM duty value corresponding to a prescribed tension, a prescribed tension or less, or a tension within a prescribed tension range is detected.

In a step S6, the control portion 11 adjusts the PWM duty of the electromagnetic clutch 93, and controls the transmission torque to the second conveyance motor 92, and the tension feedback control (PID control) starts so that the tension of the sheet W may converge to a prescribed tension range (e.g., 40 N±2 N). The PWM duty of the electromagnetic clutch 93 is changed according to the tension value of the sheet W detected at the tension detection portion 5. As a result, the driving transmission force (=torque value) is controlled by the control portion 11. At this step, the first conveyance roller pair 3 is not driven. For this reason, with the sheet W in a stopped state, the tension is controlled so as to be converged within a prescribed tension range (e.g., 40 N±2 N).

In a step S7, when it is determined that the tension has been converged within a prescribed tension range (e.g., 40 N±2 N), in a step S8, the control portion 11 starts high-speed driving of the second conveyance roller pair 9 and the first conveyance roller pair 3, and accelerates a motor until the speed of the first conveyance roller pair 3 becomes a recording speed.

Namely, for starting conveyance of the sheet W, driving of the second conveyance roller pair 9 is started at a first speed. After the detected tension of the tension detection portion 5 is converged within a prescribed tension range, the second conveyance roller pair 9 is driven at a second speed, and driving of the first conveyance roller pair 3 is started at a third speed. At this step, control is performed so that the speed may decrease in the order of the first speed, the third speed, and the second speed. Further, for acceleration thereof, control is performed so that the speed of the first conveyance roller pair 3 is normally lower than that of the second conveyance roller pair 9. The difference in speed is continued even after the speed reaches a prescribed recording speed.

Herein, the first speed, the second speed, and the third speed are each a control target speed. Namely, actual behaviors of the first conveyance roller pair 3 and the second conveyance roller pair 9 may cause variances, or the like. For this reason, the actual speeds of the first conveyance roller pair 3 and the second conveyance roller pair 9 are not necessarily in agreement with the first speed, the second speed, and the third speed. Particularly, during sheet conveyance, the actual speeds of the first conveyance roller pair 3 and the second conveyance roller pair 9 may become the same.

When in a step S9, it is determined that the conveyance speed of the first conveyance roller pair 3 has reached a recording speed (e.g., 100 m/s), and in a step S10, the tension value detected at the tension detection portion 5 is converged within a prescribed tension range (e.g., 40 N±2 N), in a step S11, recording is started. By discharging an ink by the recording head 13 according to the convey operation of the sheet W, a recording operation is performed.

When a recording stop (termination) signal is received in a step S12, the recording operation by the recording head 13 is stopped in a step S13. Subsequently, in a step S14, the operation of the first conveyance roller pair 3 is slowed down, and stopped. When in a step S15, the tension value is converged within a prescribed tension range (e.g., 40 N±2 N), in a step S16, the second conveyance roller pair 9 is stopped, and in a step S17, tension feedback control by the tension detection portion 5 and the electromagnetic clutch 93 is terminated. In a step S18, a series of sheet conveyance operations (stopped state, tension feedback control start, acceleration to the recording conveyance speed, recording start, recording termination, conveyance stop, and tension feedback control stop being successively performed) is terminated.

Figure 6:
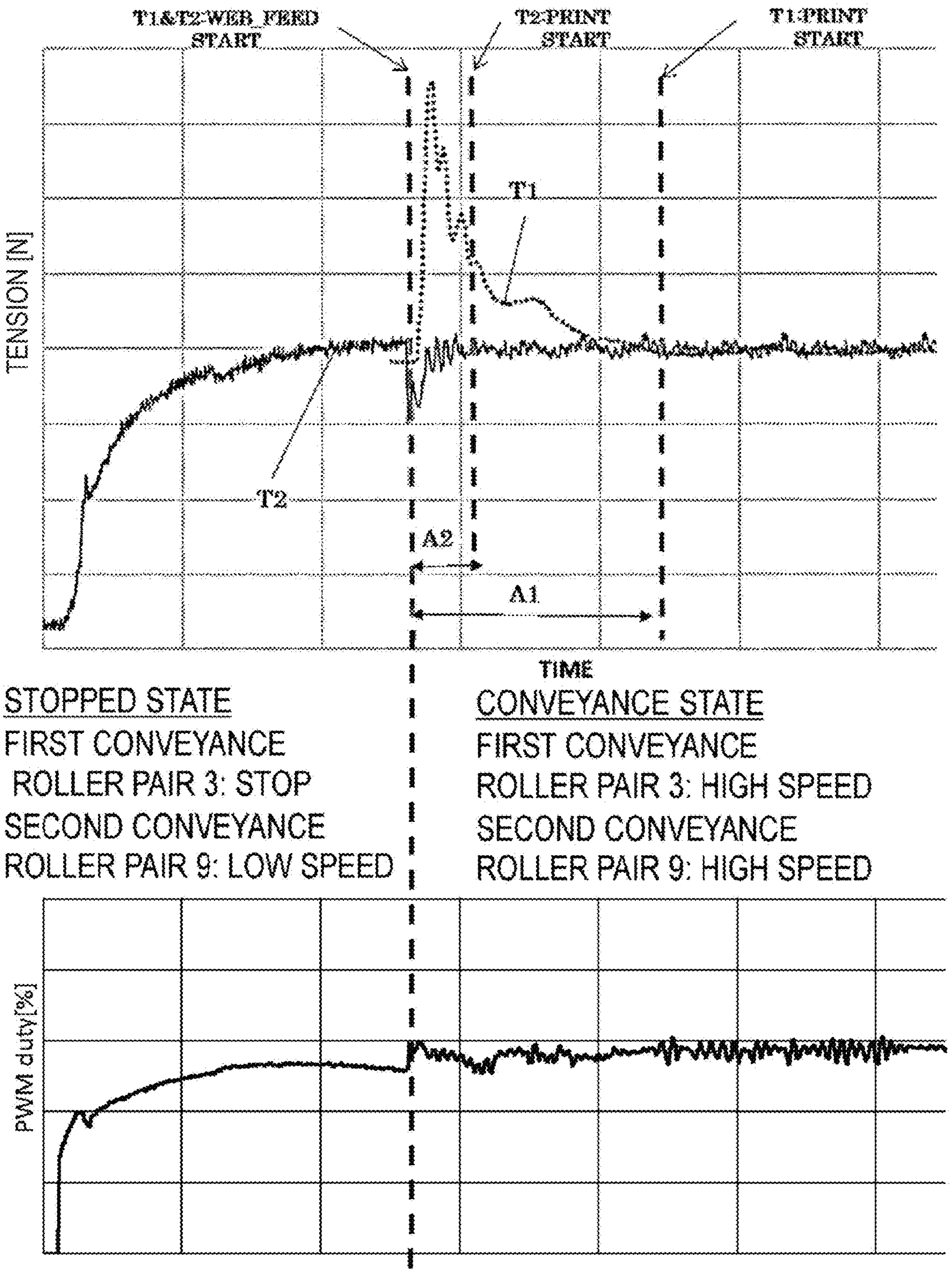
FIG. 6 is a graph for comparing the variation in tension between a conventional example and the present Example.

FIG. 6 is a graph for comparing the variation in tension generated for acceleration from the conveyance stopped state to a given speed capable of recording between a conventional example and the present Example. Further, FIG. 6 also shows one example of the relationship between the tension value and the torque value (PWM duty) in the present Example. A description will be given to a tension T1 in the case where tension control is performed in a conventional example and a tension T2 in the case where tension control is performed in the present Example.

A conventional example shows the following: the first conveyance roller pair 3 is reversely rotated from the conveyance stopped state, thereby resolving the sheet slack, and then, the first conveyance roller pair 3 and the second conveyance roller pair 9 are normally rotated at the same time, thereby causing sheet conveyance; at this step, when the first conveyance roller pair 3 is controlled from reverse rotation to normal rotation, the sheet W is applied with an excessive tension. Accordingly, even when feedback control is performed with the tension as a prescribed tension target value, a time A1 is taken to convergence, resulting in generation of waste of sheets (misprinting).

On the other hand, in the case of the present Example, the process includes a step of performing feedback control to a prescribed tension target value in a conveyance stopped state. After the sheet has reached a prescribed tension in a conveyance stopped state, sheet conveyance is started, and tension feedback control is performed. As a result, it is possible to shorten the time A2 until recording start. Accordingly, the time of the difference (A1−A2) between the time A1 from sheet conveyance start to recording start of a conventional example and the time A2 from sheet conveyance start to recording start of the present Example is shortened, and waste of sheets (misprinting) conveyed in the meantime can be reduced.

As described up to this point, in accordance with the Example, it becomes possible to suppress the variation in sheet tension for increasing the conveyance speed from the conveyance stopped state. Accordingly, it becomes possible to shorten the time until the tension is stabilized, and recording can be started, and to shorten the sheet conveyance distance (reduce the misprinting).

Example 2

Figure 5:
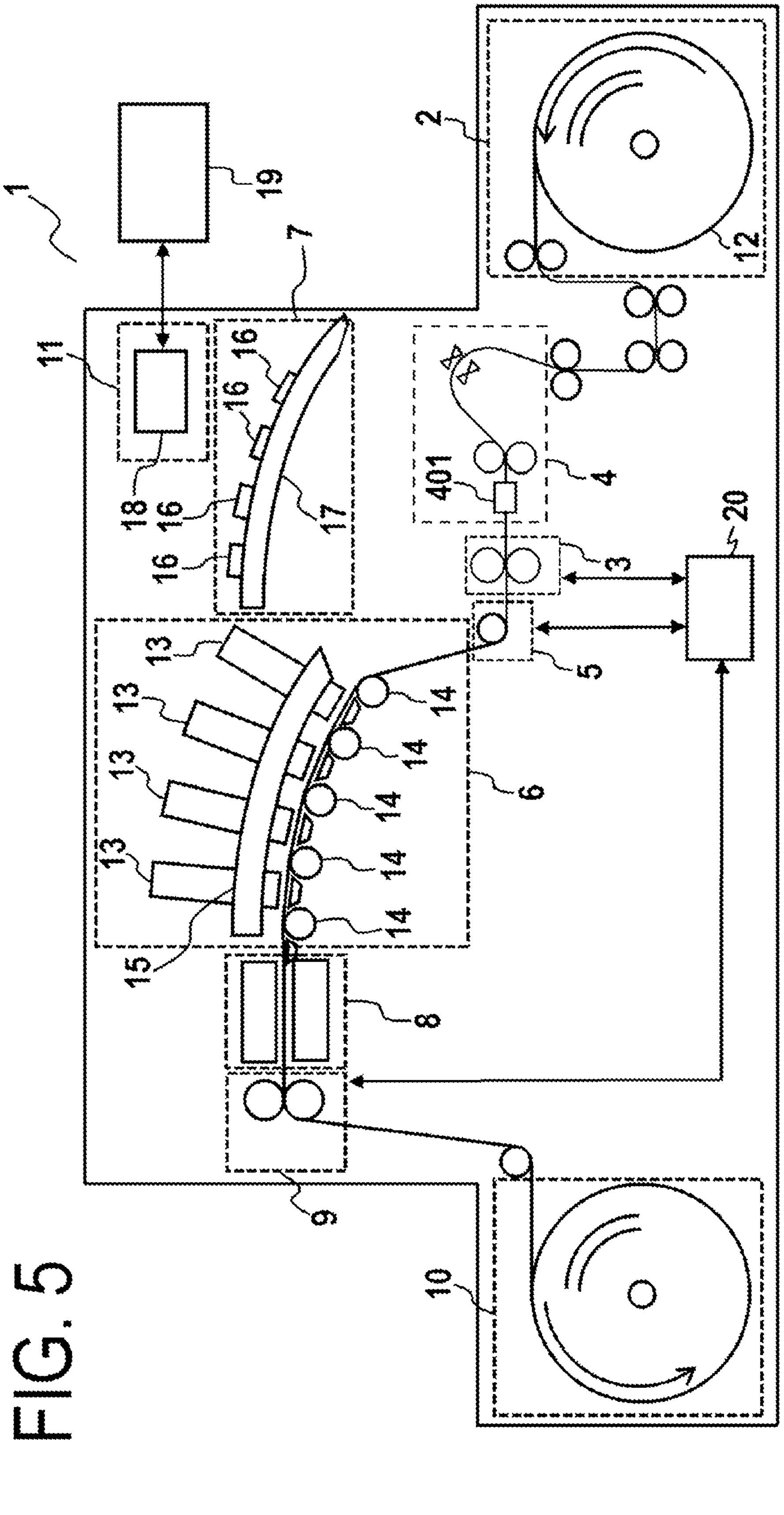
FIG. 5 is a schematic view showing an internal configuration of a recording apparatus in accordance with Example 2 of the present invention.

Referring to FIG. 5, Example 2 of the present invention will be described. FIG. 5 is a schematic view showing an internal configuration of a recording apparatus in accordance with Example 2 of the present invention. Incidentally, in Example 2, the same configurations as those in Example 1 are given the same reference numerals and signs, and will not be described. The matters herein particularly not described in Example 2 are the same as those in Example 1.

As shown in FIG. 5, in the present Example, it is configured such that the meandering correction portion 4 for regulating the ends of the sheet, thereby correcting meandering is arranged on the upstream side of the first conveyance roller pair 3. Further, the meandering correction portion 4 of the present Example is configured such that the sheet end on the side serving as the standard in the sheet width direction orthogonal to the sheet conveyance direction is pressed against a guide member 401 in the sheet width direction, thereby correcting meandering of a sheet. On the upstream side of the guide member 401, a sheet flexion (loop) is formed. Incidentally, in the case of the present Example, for general plain paper, by reducing the tension value, meandering tends to be resolved. A study by the present inventors has proved that, as compared with, for example, heavy paper such as coated paper, or paper with high rigidity, it is effective that the tension value is reduced by about 50% until meandering is resolved. When the difference in tension between the load cell of the first bearing 52 and the load cell of the second bearing 53 as the tension detecting portion is large, reduction of the tension value can increase the speed of meandering correction.

For the respective Examples, their respective configurations can be combined with each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-212016, filed on Dec. 28, 2022, which is hereby incorporated by reference herein in its entirety.

What is claimed is:

1. A recording apparatus comprising:

a recording portion for performing recording onto a continuous sheet to be conveyed;

a first conveyance roller for conveying a continuous sheet on an upstream side of the recording portion in a conveyance path of a continuous sheet;

a second conveyance roller for conveying a continuous sheet on a downstream side of the recording portion in the conveyance path; and a control unit for controlling the first conveyance roller and the second conveyance roller, wherein the control unit:

starts control such that a speed of the second conveyance roller becomes a first speed, with the first conveyance roller being stopped, and changes control such that the speed of the second conveyance roller becomes a second speed faster than the first speed, and starts control of the first conveyance roller such that a speed of the first conveyance roller becomes a third speed faster than the first speed and slower than the second speed.

2. The recording apparatus according to claim 1, further comprising:

a tension detecting unit for detecting a tension of a continuous sheet between the first conveyance roller and the second conveyance roller in the conveyance path, wherein the control unit comprises:

a power source for generating power for driving the second conveyance roller; and a torque adjusting unit capable of adjusting a torque to be transmitted from the power source to the second conveyance roller; and wherein the control unit starts control of the first conveyance roller after:

the power source is caused to generate the power, with the first conveyance roller being stopped, and a tension detected by the tension detecting unit is converged within a prescribed range by adjustment of the torque by the torque adjusting unit.

3. The recording apparatus according to claim 2, wherein the torque adjusting unit is an electromagnetic clutch provided between the power source and the second conveyance roller.

4. The recording apparatus according to claim 2, wherein the control unit performs control such that the speed of the first conveyance roller becomes slower than the speed of the second conveyance roller during conveyance of a continuous sheet.

5. The recording apparatus according to claim 2, wherein for starting conveyance of a continuous sheet, after a tension detected by the tension detecting unit falls within a prescribed tension range or lower, the torque adjusting unit starts transmission of a torque from the power source to the second conveyance roller.

6. The recording apparatus according to claim 2, wherein the tension detecting unit has a tension detecting roller for extending, in a tensioned state, a continuous sheet, and a tension detection member provided at each of a pair of bearings for pivotally supporting both ends of the tension detecting roller.

7. The recording apparatus according to claim 6,
wherein in a case where a difference in tension between both ends of the tension detecting roller detected by the tension detecting unit exceeds a prescribed value, the torque adjusting unit adjusts the torque.

8. The recording apparatus according to claim 2, further comprising:
a meandering correcting unit for correcting meandering of a continuous sheet between the first conveyance roller and the recording portion in the conveyance path.

9. The recording apparatus according to claim 8,
wherein the meandering correcting unit has a meandering correcting roller for extending, in a tensioned state, a continuous sheet, and being capable of changing parallelism with respect to the first conveyance roller and a continuous sheet.

10. The recording apparatus according to claim 2, further comprising:
a meandering correcting unit for a continuous sheet on an upstream side of the first conveyance roller in the conveyance path.

11. The recording apparatus according to claim 10,
wherein the meandering correcting unit has a guide member for regulating an end portion of a continuous sheet in a width direction of a continuous sheet orthogonal to a conveyance direction of a continuous sheet in the width direction.

12. A method for controlling a recording apparatus,
the recording apparatus including:
a recording portion for performing recording onto a continuous sheet to be conveyed,
a first conveyance roller for conveying a continuous sheet on an upstream side of the recording portion in a conveyance path of a continuous sheet,
a second conveyance roller for conveying a continuous sheet on a downstream side of the recording portion in the conveyance path, and
a control unit for controlling the first conveyance roller and the second conveyance roller,
the method for controlling the recording apparatus comprising:
starting control such that a speed of the second conveyance roller becomes a first speed, with the first conveyance roller being stopped; and
changing control such that the speed of the second conveyance roller becomes a second speed faster than the first speed, and starting control of the first conveyance roller such that a speed of the first conveyance roller becomes a third speed faster than the first speed and slower than the second speed.

13. The method for controlling a recording apparatus according to claim 12,
wherein the recording apparatus further comprises a tension detecting unit for detecting a tension of a continuous sheet between the first conveyance roller and the second conveyance roller in the conveyance path,
wherein the control unit comprises:
a power source for generating power for driving the second conveyance roller; and
a torque adjusting unit capable of adjusting a torque to be transmitted from the power source to the second conveyance roller; and
wherein the control unit starts control of the first conveyance roller after:
the power source is caused to generate the power, with the first conveyance roller being stopped, and
the torque is adjusted by the torque adjusting unit such that a tension detected by the tension detecting unit is converged within a prescribed range.

14. The method for controlling a recording apparatus according to claim 13,
wherein the torque adjusting unit is an electromagnetic clutch provided between the power source and the second conveyance roller.

15. The method for controlling a recording apparatus according to claim 13,
wherein the control unit performs control such that the speed of the first conveyance roller may become slower than the speed of the second conveyance roller during conveyance of a continuous sheet.

16. The method for controlling a recording apparatus according to claim 13,
wherein for starting conveyance of a continuous sheet,
after a tension detected by the tension detecting unit falls within a prescribed tension range or lower,
the torque adjusting unit starts transmission of a torque from the power source to the second conveyance roller.

* * * * *